United States Patent
Ohhira et al.

(10) Patent No.: US 7,324,179 B2
(45) Date of Patent: Jan. 29, 2008

(54) REFLECTOR, DISPLAY DEVICE, AND ELECTRONIC APPARATUS

(75) Inventors: Makoto Ohhira, Nara (JP); Motohiko Matsushita, Nara (JP); Akihiro Funamoto, Nara (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 26 days.

(21) Appl. No.: 10/789,458

(22) Filed: Feb. 27, 2004

(65) Prior Publication Data
US 2004/0189897 A1    Sep. 30, 2004

(30) Foreign Application Priority Data
Feb. 28, 2003    (JP) ............................ 2003-054465

(51) Int. Cl.
*G02F 1/1335* (2006.01)
(52) U.S. Cl. ...................................... 349/113
(58) Field of Classification Search ............... 349/113
See application file for complete search history.

(56) References Cited
U.S. PATENT DOCUMENTS 6,285,425 B1 * 9/2001 Akins et al. ............... 349/113
6,285,426 B1 * 9/2001 Akins et al. ............... 349/113
2002/0149723 A1 * 10/2002 Funamoto et al. ......... 349/113
2002/0159009 A1 * 10/2002 Funamoto et al. ......... 349/113

OTHER PUBLICATIONS

Esp@cenet document view, Patent No. JP2002040219, Publication Date Feb. 6, 2002, 1 page.

* cited by examiner

*Primary Examiner*—David Nelms
*Assistant Examiner*—Phu Vu
(74) *Attorney, Agent, or Firm*—Osha Liang LLP (57) ABSTRACT

A reflector is used in a display device and is disposed parallel to a predetermined plane, and has plural unit reflecting portions each having a reflection face for reflecting incident light in a direction different from that of regular reflection light of the predetermined plane. Further, the distance between a first tangential plane abutting on a first reflection face arranged in an arbitrarily extracted first unit reflecting portion at a reference point arranged in an arbitrary position on the first reflection face, and a second tangential plane abutting on a second reflection face arranged in a second unit reflecting portion adjacent to the first unit reflecting portion in parallel with the first tangential plane is preferably half or more of a coherent length of the incident light.

12 Claims, 9 Drawing Sheets

REFLECTOR, DISPLAY DEVICE, AND ELECTRONIC APPARATUS

BACKGROUND OF THE INVENTION

1. Field of the Invention

The present invention relates to a reflector used in a display device, particularly, a liquid crystal display device.

2. Description of the Related Art

In a reflection type liquid crystal display device using a reflector for reflecting external light, it is not necessary to use a backlight and it is excellent in a reduction in power consumption. The general liquid crystal display device has a liquid crystal layer between an upper side substrate and a lower side substrate, and the reflector is arranged on the upper or lower side of the lower side substrate. The reflector has irregularities for diffusing and reflecting incident light. Further, when this irregular shape is determined so as to diffuse and reflect the incident light in a direction different from the direction of regular reflection, no direction of light diffused and reflected on the reflector is conformed to the direction of light reflected on the surface of the upper side substrate so that a reduction in visibility of the liquid crystal display device can be prevented.

On the other hand, it is known that coloring due to interference of the incident light is caused in the reflector regularly arranging the fine irregularities therein. Therefore, trials for dispersing the distances between the irregularities and the heights of the irregularities are made.

However, problems exist in that light utilization efficiency of the reflection light is reduced and ununiformity of diffusing characteristics of the reflection light is caused and the reflection characteristics are reduced in accordance with the dispersion of the distances between the irregularities and the heights. Further, when the distances between the irregularities and the heights are dispersed, a problem exists in that a function for diffusing and reflecting the incident light in a predetermined desirable direction different from the regular reflection direction is damaged.

SUMMARY OF THE INVENTION

A first reflector in the present invention is characterized in that the first reflector is disposed parallel to a predetermined plane, and has plural unit reflecting portions each having a reflection face for reflecting incident light in a direction different from that of regular reflection light of the predetermined plane, wherein the distance between a first tangential plane abutting on a first reflection face arranged in an arbitrarily extracted first unit reflecting portion at a reference point arranged in an arbitrary position on the first reflection face, and a second tangential plane abutting on a second reflection face arranged in a second unit reflecting portion adjacent to the first unit reflecting portion in parallel with the first tangential plane is half or more of a coherent length of the incident light.

A second reflector in the present invention is characterized in that the second reflector is disposed parallel to a predetermined plane, and has plural unit reflecting portions each having a reflection face for reflecting incident light in a direction different from that of regular reflection light of the predetermined plane, wherein an average of the distance between a first tangential plane abutting on a first reflection face arranged in an arbitrarily extracted first unit reflecting portion at a reference point arranged in an arbitrary position on the first reflection face, and a second tangential plane abutting on a second reflection face arranged in a second unit reflecting portion adjacent to the first unit reflecting portion in parallel with the first tangential plane is half or more of a coherent length of the incident light.

A third reflector in the present invention is characterized in that the third reflector is disposed parallel to a predetermined plane, and has plural unit reflecting portions each having a reflection face for reflecting incident light in a direction different from that of regular reflection light of the predetermined plane, wherein, when a frequency distribution is calculated by setting to a variable the distance between a first tangential plane abutting on a first reflection face arranged in an arbitrarily extracted first unit reflecting portion at a reference point arranged in an arbitrary position on the first reflection face, and a second tangential plane abutting on a second reflection face arranged in a second unit reflecting portion adjacent to the first unit reflecting portion in parallel with the first tangential plane, the distance for maximizing the frequency is half or more of a coherent length of the incident light.

The present invention is also characterized in a light reflecting method for reflecting incident light in a direction different from the direction of regular reflection of a predetermined plane by using a reflector having plural unit reflecting portions disposed parallel to the predetermined plane, wherein an optical path length difference for maximizing frequency is set to a coherent length or more of the incident light when a frequency distribution having the optical path length difference of incident reflection light reflected on a pair of arbitrary adjacent unit reflecting portions as a variable is calculated.

DESCRIPTION OF THE PREFERRED EMBODIMENTS

The preferred embodiment modes of the present invention will next be explained with reference to the drawings. The sizes, materials, shapes, relative positions, etc. of members and portions described in the embodiments of this invention do not limit the scope of this invention to these sizes, etc. unless there is a specific description, and are simply explanation examples.

First Embodiment Mode

Figure 1:
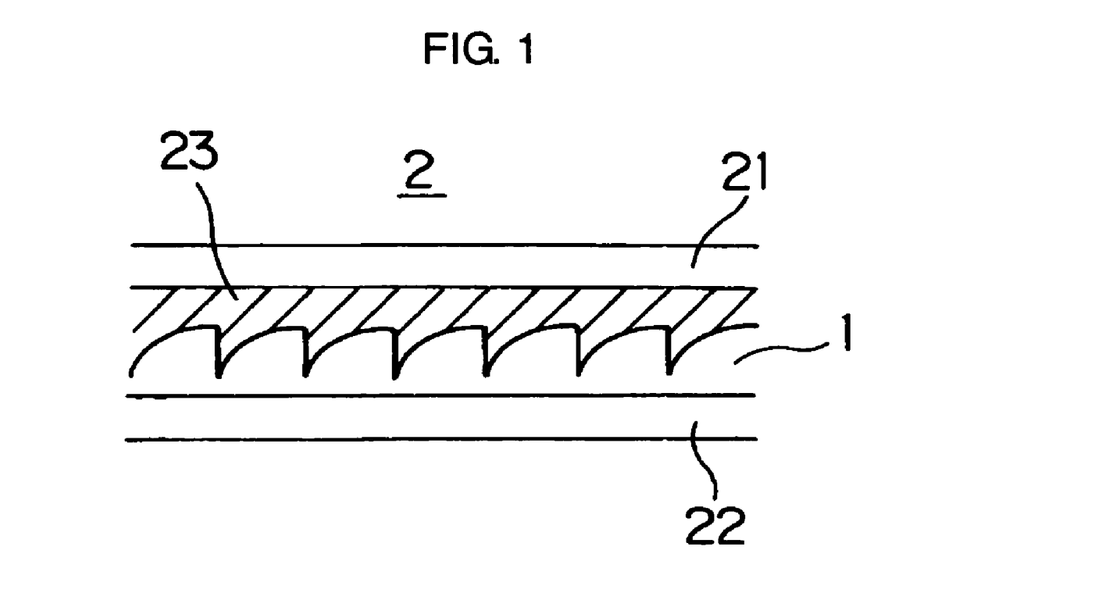
FIG. 1 shows a cross-sectional view showing the construction of a liquid crystal display device.

FIG. 1 is a cross-sectional view showing the main construction of a liquid crystal display device adopting a reflector 1 in the present invention. The liquid crystal display device 2 has a liquid crystal layer 23 between an upper side substrate 21 and a lower side substrate 22. The reflector 1 is integrally made on the liquid crystal side surface of the lower side substrate 22. External light is incident from above the upper side substrate 21, and is reflected on the reflector 1, and is emitted to the exterior through the upper side substrate 21. For example, predetermined desirable display of characters, images, etc. can be obtained by modulating the incident reflection light by the liquid crystal layer at this time.

The shape of the reflector 1 is determined such that the reflection light reflected on the reflector 1 is advanced in a direction different from that of regular reflection light regularly reflected on the surface of the upper side substrate as a predetermined plane, or regular reflection light regularly reflected on the surface of the reflector before the formation of a unit reflecting portion when the external light is incident from above the upper side substrate 21.

Figure 2:
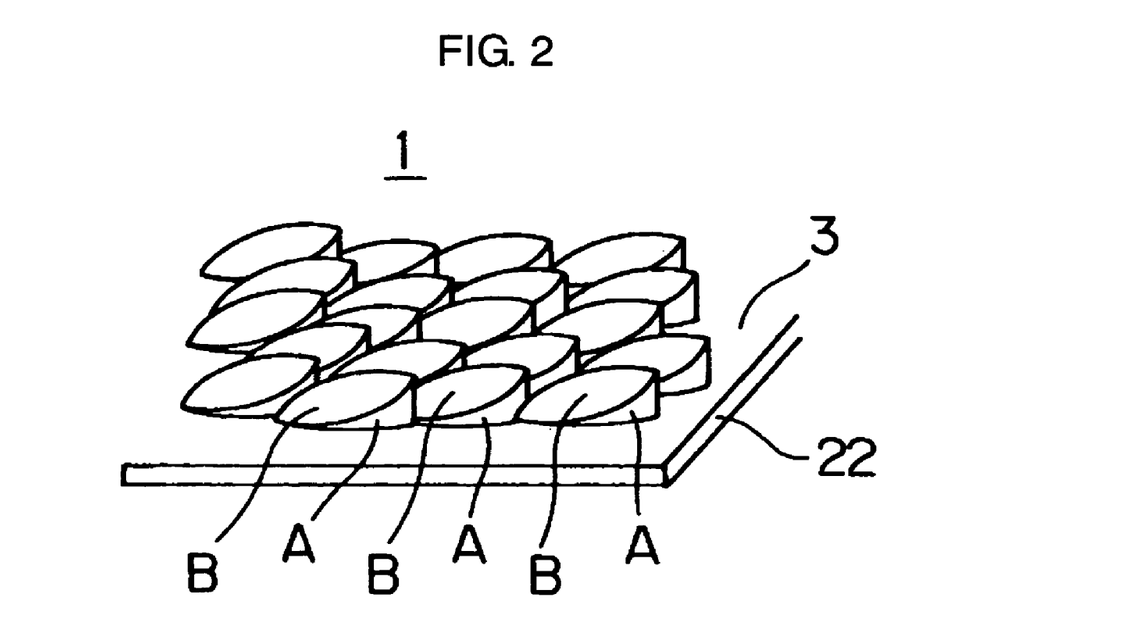
FIG. 2 shows a conceptual view showing the construction of a reflector.

FIG. 2 is a perspective view of the reflector 1, and partially enlarges and shows the reflector 1. The reflector 1 is constructed by forming plural unit reflecting portions A on the substrate surface 3 of the lower side substrate 22. The unit reflecting portion A has a reflection face B as a curved face, and the shape of the reflection face B is determined so as to reflect light in a predetermined direction.

The unit reflecting portion A is not limited to the convex shape shown in FIG. 2, but may be also set to e.g., a concave shape.

Figure 3A:
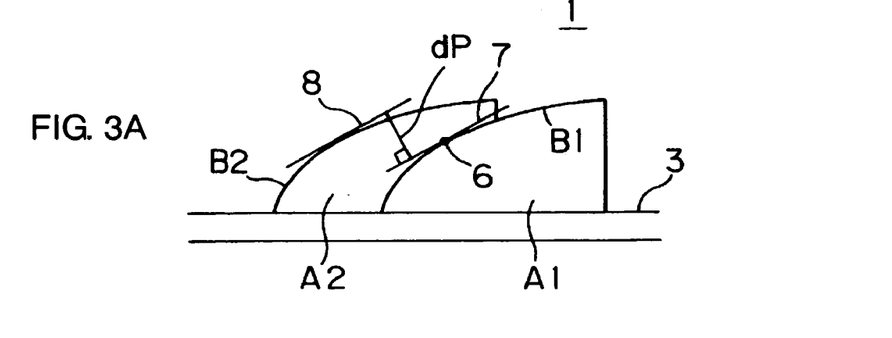
FIG. 3 shows a conceptual view showing the relation of two adjacent unit reflecting portions.
Figure 3B:
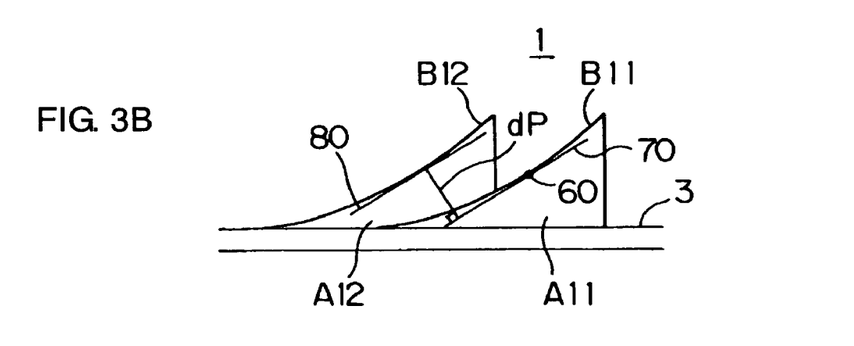

FIGS. 3A and 3B are explanatory views of the reflector 1 including the unit reflecting portion arbitrarily extracted from above the reflector 1, and a unit reflecting portion adjacent to this unit reflecting portion. FIG. 5A shows a case in which the reflection face of the unit reflecting portion has a convex shape. FIG. 5B shows a case in which the reflection face of the unit reflecting portion has a concave shape. Here, "be adjacent" means that it is arranged around. With respect to the unit reflecting portion arbitrarily extracted, all the unit reflecting portions arranged around this arbitrarily arranged unit reflecting portion are called adjacent unit reflecting portions. Concretely, all the unit reflecting portions are first orthogonally projected onto the substrate surface 3, and the center point of gravity of a projection face of the arbitrarily extracted unit reflecting portion is next determined. Further, in each direction widened in a radial shape on the substrate surface 3 from this center point of gravity, the unit reflecting portion having the projection face in a minimum position in distance is determined as the adjacent unit reflecting portion. Namely, two unit reflecting portions arranged through a separate unit reflecting portion therebetween are not called adjacent unit reflecting portions. In two adjacent unit reflecting portions, there is a case in which the base bottom faces of both these adjacent unit reflecting portions are abutted on each other and are separated from each other.

In FIG. 3A, a tangential plane abutting on a first reflection face B1 is set to a first tangential plane 7 at an arbitrary reference point 6 on the first reflection face B1 arranged in a first unit reflecting portion A1 arbitrarily extracted from above the reflector 1. Further, a reflection face arranged in a second unit reflecting portion A2 adjacent to the first unit reflecting portion A1 is set to a second reflection face B2. Further, when a tangential plane parallel to the first tangential plane 7 and abutting on the second reflection face B2 is set to a second tangential plane 8, the positions of the first unit reflecting portion A1 and the second unit reflecting portion A2 are determined such that the distance between the first tangential plane 7 and the second tangential plane 8 (hereinafter set to an inter-tangential-plane distance dP) is half or more of the coherent length Lc of incident light. Namely, the relation of inter-tangential-plane distance dP≧coherent length Lc/2 of incident light is satisfied in all the unit reflecting portions on the reflector 1.

Thus, the difference in optical path length between two parallel lights incident to the reflection faces B1 and B2 becomes at least 2×dP or more (namely, Lc or more) by arranging the first unit reflecting portion A1 and the second unit reflecting portion A2.

No light of the coherent length or more in the optical path length difference interferes as nature of light. Therefore, no interference is caused in the light reflected on the reflector 1 by determining each reflection face such that the reflection light from a pair of adjacent reflection faces arbitrarily extracted from above the reflector 1 has the optical path length difference of the coherent length or more of the incident light.

Namely, the interference of the reflection light reflected on the reflector 1 can be prevented if the position of the unit reflecting portion is determined so as to satisfy the relation of inter-tangential-plane distance dP≧coherent length Lc/2 of incident light in all the adjacent unit reflecting portions within the reflector face.

Here, the coherent length Lc is a value provided by dividing the coherent length within the air by the refractive index of a medium transmitting light therethrough. For example, the coherent length of the sunlight within the air is 3 μm. Accordingly, a value (=3 μm/n) provided by dividing 3 μm by the refractive index n of a layer (e.g., a liquid crystal layer, a resin layer, etc.) covering the first reflection face B1 and the second reflection face B2 becomes the coherent length Lc when the sunlight is used as the incident light in this embodiment mode. In this case, it is sufficient for the inter-tangential-plane distance dP to satisfy dP≧3 μm/2n. Here, when the liquid crystal layer and the resin layer of refractive index n≅1.5 cover the first reflection face B1 and the second reflection face B2, it is sufficient to set the inter-tangential-plane distance dP to 1 μm or more.

Next, when the incident light is set to artificial light (light of a fluorescent lamp, light of an incandescent lamp, etc.) for illumination, the relation of the inter-tangential-plane distance dP and the coherent length Lc can be similarly calculated. However, the coherent length of the artificial light for illumination within the air is less than 3 μm and is smaller than that of the sunlight. Accordingly, if the inter-tangential-plane distance dP is determined with the coherent length of the sunlight as a base, no interference is caused in light reflected on the reflector 1 even when any one of the sunlight and the artificial light for illumination is used.

Further, more strictly, the interference of the reflection light can be prevented even when the positions of the first unit reflecting portion A1 and the second unit reflecting portion A2 are determined such that the optical path length difference of the incident reflection lights respectively reflected on the first reflection face B1 and the second reflection face B2 becomes the coherent length Lc of the incident light or more.

FIG. 3B shows the reflector having a concave reflection face of the unit reflecting portion. Similar effects can be also obtained even when the first unit reflecting portion A1, the first reflection face B1, the reference point 6, the first tangential plane 7, the second unit reflecting portion A2, the second reflection face B2 and the second tangential plane 8 in FIG. 3A are respectively replaced with a first unit reflecting portion A11, a first reflection face B11, a reference point 60, a first tangential plane 70, a second unit reflecting portion A12, a second reflection face B12 and a second tangential plane 80 in FIG. 3B.

In FIGS. 3A and 3B, the shape of the unit reflecting portion is set to the convex shape, but may be also set to a concave shape.

It is most preferable to set the inter-tangential-plane distance dP of an adjacent unit reflecting portion to half of the coherent length Lc of the incident light with respect to all the unit reflecting portions on the reflector. However, even when light having the position relation of the unit reflecting portion having the inter-tangential-plane distance dP less than half of the coherent length Lc of the incident light is mixed on the reflector, the reflector having no coloring due to the interference can be substantially obtained if the inter-tangential-plane distance dP equal to or greater than half of the coherent length Lc of the incident light is dominant.

Figure 4:
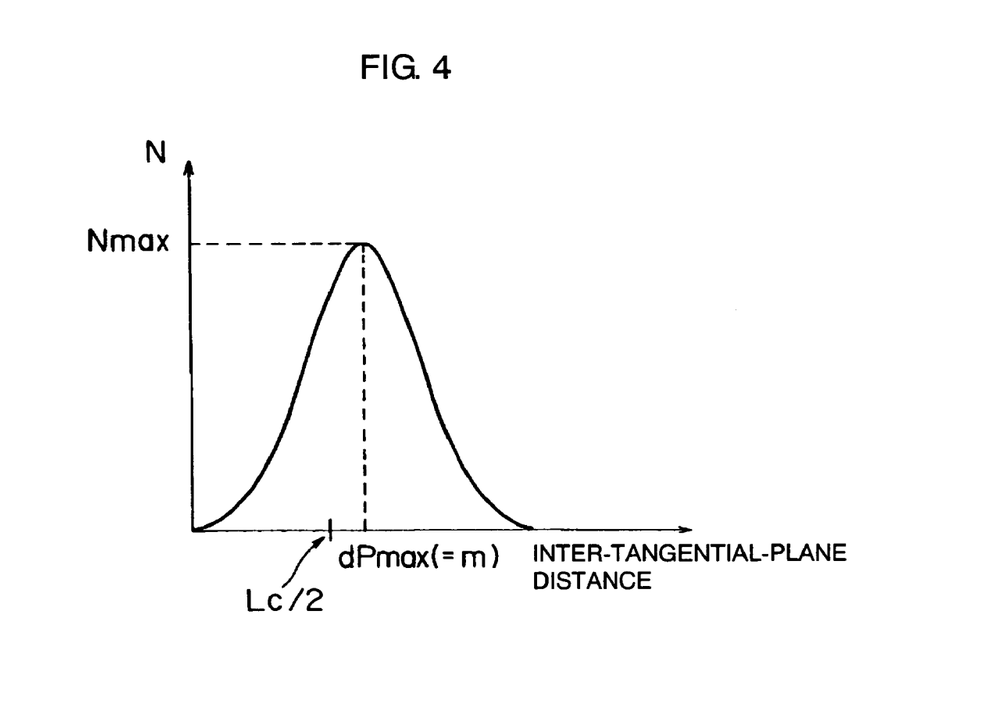
FIG. 4 shows a graph showing a frequency distribution of the distance (dP) between tangential planes of the unit reflecting portion.

FIG. 4 is a graph in which the inter-tangential-plane distance dP of all the unit reflecting portions and adjacent unit reflecting portions in the reflector 1 is measured and is shown as a frequency distribution.

The axis of abscissa shows the inter-tangential-plane distance dP, and the axis of ordinate shows frequency (N). Further, Nmax shows a maximum value of the frequency, and dPmax shows the distance between tangential planes maximum in frequency, and m shows an average value of the inter-tangential-plane distance. This reflector is arranged such that the dispersion of dP has a normal distribution in the unit reflecting portion. Further, dPmax and m are set to be equal to each other.

In the reflector 1, there is also a case in which the inter-tangential-plane distance dP of the unit reflecting portion is less than half of the coherent length Lc of the incident light. However, dPmax and/or m is half or more of the coherent length Lc of the incident light. Accordingly, if the reflection light is observed as a whole, the reflection light from the unit reflecting portion arranged so as to set the inter-tangential-plane distance dP to half or more of the coherent length Lc of the incident light becomes dominant. Therefore, the reflection light can be visualized as light substantially having no coloring in a rainbow shape.

The arrangement of the unit reflecting portion on the reflector is not limited to the arrangement for setting its inter-tangential-plane distance dP so as to have the normal distribution.

Figure 5:
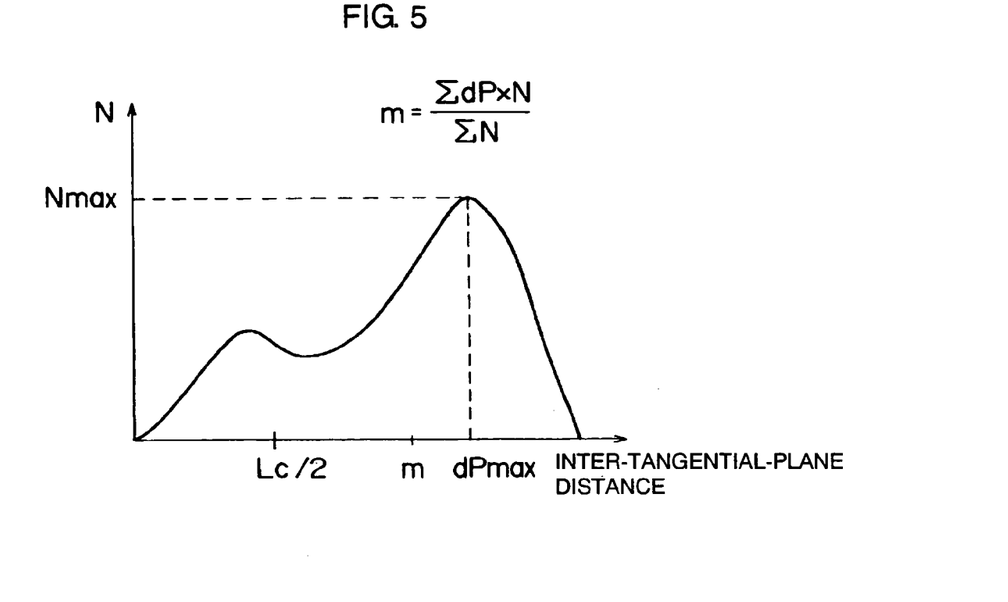
FIG. 5 shows a graph showing the frequency distribution of the distance (dP) between the tangential planes of the unit reflecting portion.

FIG. 5 is a graph showing a frequency distribution of the inter-tangential-plane distance dP of an adjacent unit reflecting portion in another reflector. The axis of ordinate, the axis of abscissa and symbols within the graph are similar to those in FIG. 4. As shown in FIG. 5, even when the frequency distribution of the inter-tangential-plane distance dP shows a curve except for the normal distribution, the reflection light from the unit reflecting portion arranged at an interval of half or more of the coherent length Lc of the incident light becomes dominant if the unit reflecting portion is arranged so as to set dPmax and/or m to satisfy half or more of the coherent length Lc of the incident light. Accordingly, it is possible to obtain reflection light substantially having no coloring in the rainbow shape. The value m is equal to a value provided by dividing the area of a portion surrounded by the frequency distribution curve and the axis of abscissa by a total frequency number.

When the unit reflecting portion is arranged such that the average value m of the inter-tangential-plane distance dP is half or more of the coherent length Lc of the incident light, and/or the distance dPmax maximum in frequency is half or more of the coherent length Lc of the incident light, the reflector substantially having no coloring in the rainbow shape can be obtained if all the unit reflecting portions adjacent to the arbitrarily extracted unit reflecting portion are considered and arranged as mentioned above. However, the mixture of the interference light can be further prevented if the relation of inter-tangential-plane distance dP≧coherent length Lc/2 of incident light is satisfied only between the adjacent unit reflecting portions in the direction perpendicular to the maximum intensity direction of a light beam reflected on its reflection face with respect to the arbitrarily extracted unit reflecting portion.

Figure 6:
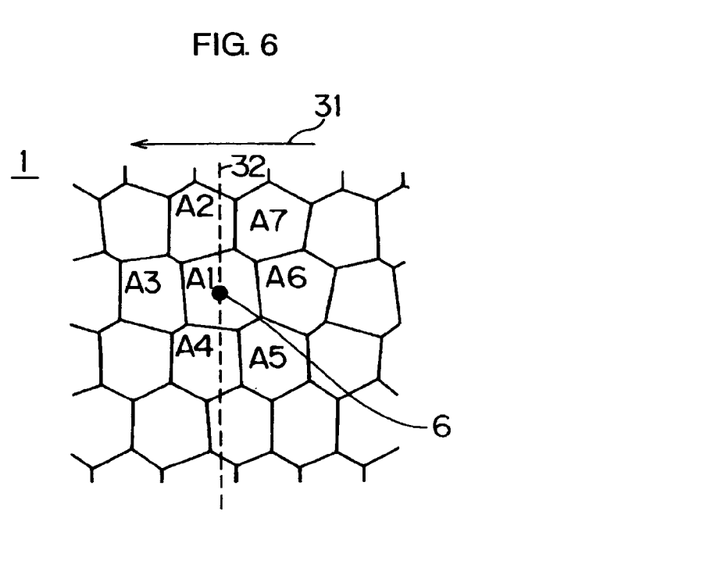
FIG. 6 shows a top view showing one portion of a reflection face of the reflector.

FIG. 6 is a top view of another reflector. A line segment obtained by orthogonally projecting onto the substrate surface the average vector of a normal line vector calculated at each point of the reflection face of a unit reflecting portion A1 arbitrarily selected from the reflector is set to a projection average vector line 31. A straight line 32 is a straight line passing a reference point 6 of the unit reflecting portion A1 on the substrate surface and perpendicular to the projection average vector 31. Unit reflecting portions A2, A4 abutting on the unit reflecting portion A1 in the direction of the straight line 32 are selected. The inter-tangential-plane distance dP between a first tangential plane at the reference point 6 and a second tangential plane in the unit reflecting portion A2 is then calculated. Further, the inter-tangential-plane distance dP between the first tangential plane at the reference point 6 and a second tangential plane in the unit reflecting portion A4 is also calculated. The inter-tangential-plane distances of unit reflecting portions A3, A5, A6, A7 abutting on the unit reflecting portion A1 in the direction except for the straight line 32 are removed (no inter-tangential-plane distances dP are calculated).

In all the unit reflecting portions on the reflector 1, the above frequency distribution is calculated by using the inter-tangential-plane distance dP similarly calculated. When the unit reflecting portions are arranged such that dPmax and/or m in this frequency distribution satisfies half or more of the coherent length Lc of the incident light, this reflector 1 can greatly reduce the mixture of the interference light.

The reasons are as follows. Namely, in the reflector 1, there are many cases in which the distance between the projection face reference points obtained at the orthogonal projecting time of each reference point of the adjacent unit reflecting portion onto the substrate surface 3 is set to 5 μm or more in view of easiness in manufacture. There are also many cases in which the inter-tangential-plane distance dP of the unit reflecting portion adjacent in the direction parallel to the above projection average vector line 31 satisfies half or more of the coherent length Lc of the incident light. Accordingly, the mixture of the interference light can be greatly reduced if the relation of inter-tangential-plane distance dP≧coherent length Lc/2 of incident light is satisfied by considering only the unit reflecting portion adjacent in the direction perpendicular to the projection average vector line 31 having a possibility that the inter-tangential-plane distance is half or less of the coherent length Lc of the incident light.

A maximum allowance value of the inter-tangential-plane distance will next be described.

When the average sight of a human being is set to 1.0, the size of a visible object from a position separated by 300 mm is about 80 µm. Namely, if the size of the unit reflecting portion is set to 80 µm or less in the reflector 1, no reflection light reflected on the individual unit reflecting portion A is visualized in a dot shape, and the reflector is visualized as continuous light.

Figure 7:
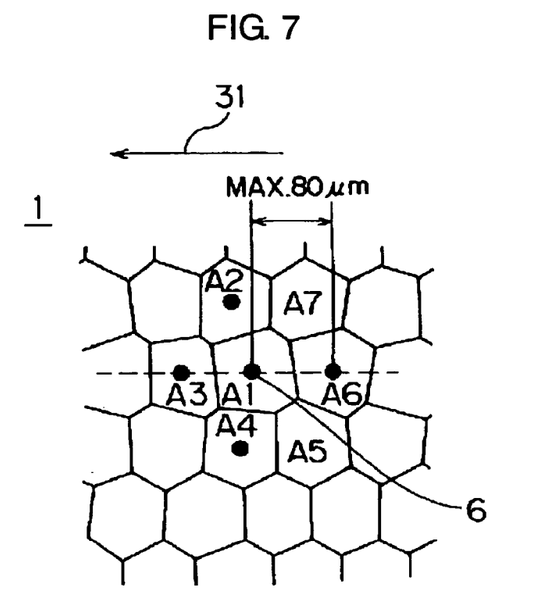
FIG. 7 shows a top view showing one portion of the reflection face of the reflector.

FIG. 7 is a surface view of the reflector. Reference numbers of FIG. 7 are respectively equal to those of FIG. 6. The inter-tangential-plane distance dP between the first tangential plane of an arbitrarily extracted unit reflecting portion A1 and the second tangential plane of an adjacent unit reflecting portion has a maximum value when the unit reflecting portions (A3, A6) are arranged in a straight line shape in the directions of A1 and the average projection vector line 31. Namely, if the value of dP is set to 80 µm or less, the reflection light in the unit reflecting portion is not formed in a dot shape, but is visualized as continuous light.

Further, the maximum value of dP is more preferably set to 40 µm or less.

Figure 8:
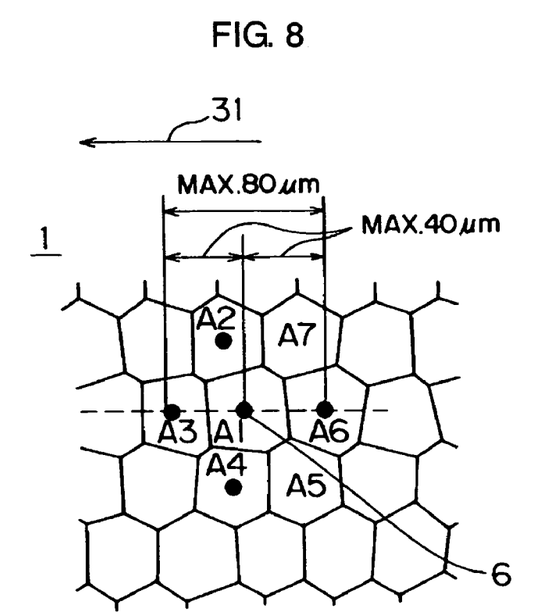
FIG. 8 shows a top view showing one portion of the reflection face of the reflector.

FIG. 8 is similarly a top view of the reflector. Reference numbers of FIG. 8 are respectively equal to those of FIG. 6. If the distance between the projection face reference points of the unit reflecting portions is set to 40 µm or less, the distance between the projection face reference points of A3 and A6 adjacent to the unit reflecting portion A1 can be secured as 80 µm or less even when the function of the unit reflecting portion A1 as a reflecting portion is damaged by missing the unit reflecting portion A1 at a manufacture time of the reflector and attaching dust. Similar to the above case, the distance between the projection reference points can be considered as a maximum value of the inter-tangential-plane distance (dP). Accordingly, probability for obtaining continuous reflection light is raised by setting dP to 40 µm or less so that reliability as the reflector can be improved.

In the above explanation, the explanation has been made by noticing that the relative position of the unit reflecting portion is changed as a method for changing the inter-tangential-plane distance dP. However, the method for changing the inter-tangential-plane distance dP may be also replaced with each of the following methods.

(1) The relative position of the unit reflecting portion is changed.

(2) The angle of the reflection face of the unit reflecting portion is mutually changed.

(3) The size of the unit reflecting portion is relatively changed.

(4) The height of the unit reflecting portion is relatively changed.

(5) A curvature changing position of the reflection face of the unit reflecting portion is changed within the reflection face.

Further, plural methods of the above methods can be also combined.

Second Embodiment Mode

Figure 9:
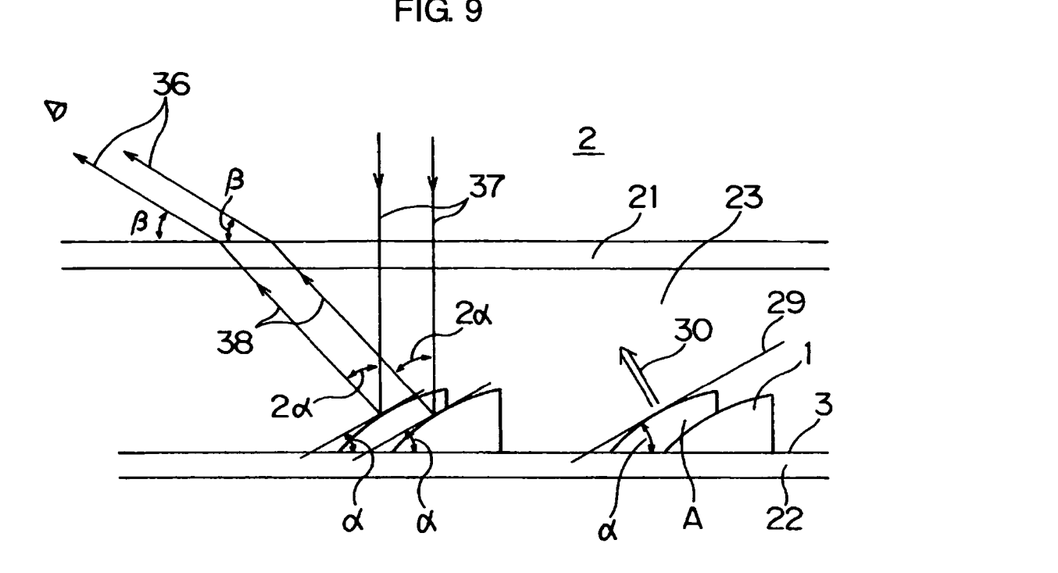
FIG. 9 shows an explanatory view showing the behavior of reflection light.

FIG. 9 is an explanatory view of a reflector in a second embodiment mode of the present invention. The reflection face B of a unit reflecting portion A has a curved shape. An average vector 30 is an average vector of normal line vectors calculated at respective points on the reflection face B of the unit reflecting portion A. A plane 29 is a plane perpendicular to the average vector 30. The crossing angle of the plane 29 and the substrate surface 3 is set to α. Here, in all the unit reflecting portions A on the reflector 1, the shape of the reflection face B is determined such that α lies within the range of 5 degrees or more and 15 degrees or less.

At this time, an incident light beam 37 incident from the direction perpendicular to the substrate surface 3 is reflected on the unit reflecting portion A at an angle of 2α with respect to the incident light beam 37 in a maximum intensity direction 38 of reflection light. In the case of a liquid crystal display device 2 in a typical utilization mode of the reflector, there are a liquid crystal layer 23 and an upper side substrate 21 manufactured by glass on the reflector 1, and there is further a visualizing point through an air layer. Here, when the refractive indexes of the liquid crystal layer 23 and the upper side substrate 21 are set to 1.5, emission light 36 emitted from the upper side substrate 21 to the exterior is emitted at an angle β with respect to the upper side substrate. The angle β at this time becomes a value of 30 degrees ±15 degrees from the Snell's law.

When this reflector 1 is used, perpendicularly incident light can be emitted in the direction of 30 degrees ±15 degrees most optimum in the observation of a display face of the liquid crystal display device 2.

When a point at which a face parallel to the plane 29 among the tangential plane of the reflection face B abuts on the reflection face B is set to the reference point 6 described with reference to FIGS. 7 and 8, the first tangential plane has an angle of the range of 5 degrees or more and 15 degrees or less with respect to the substrate surface 3. At this time, the maximum value of the inter-tangential-plane distance dP becomes about 20 µm (=80 µm×sin15°) with respect to the above 80 82 m, and can be more preferably replaced with about 10 µm (=40 µm×sin15°) with respect to the above 40 µm.

Third Embodiment Mode

Figure 10:
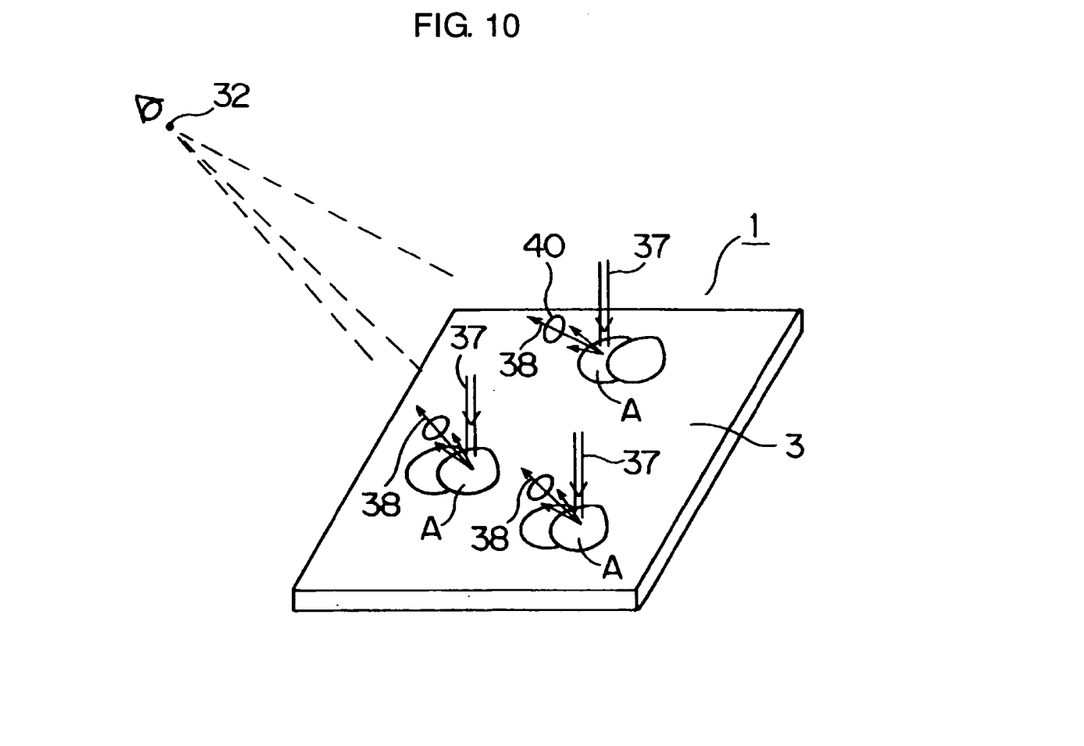
FIG. 10 shows a perspective view of the reflector.

FIG. 10 is a perspective view of a reflector in a third embodiment mode of the present invention. The reflection face B of a unit reflecting portion A has a curved shape. An incident light beam 37 incident from the direction perpendicular to the substrate surface 3 is reflected on the unit reflecting portion A. Its emission light beam is shown by a maximum intensity direction 38 and a diffusion direction 40. The maximum intensity directions 38 of lights reflected on a large part of unit reflecting portions on the reflector cross each other in a predetermined position 32 (visualizing position) within space.

Since the reflector 1 arranging the unit reflecting portion A therein in this way can converge the reflection light to the visualizing position, the reflection lights from all the unit reflecting portions A can be visualized when the reflector 1 is visualized from this converging position. Namely, brightness irregularities of the reflection light within the face of the reflector 1 can be reduced.

As mentioned above, the reflection light of light incident from the perpendicular direction has been considered, but this light also crosses at a point in space even when this light is a parallel light beam incident to the reflector at a certain angle.

Here, the number of predetermined positions 32 within the space is not limited to one, but may be also plural. Further, it is most preferable that the maximum intensity directions 38 of all the unit reflecting portions on the reflector cross each other in the predetermined position. However, if 50% or more of the unit reflecting portions is formed to cross the maximum intensity directions 38, no human being has an uncomfortable feel with respect to brightness irregularities so that a practical allowance range is attained.

Fourth Embodiment Mode

Figures 11, 12A:
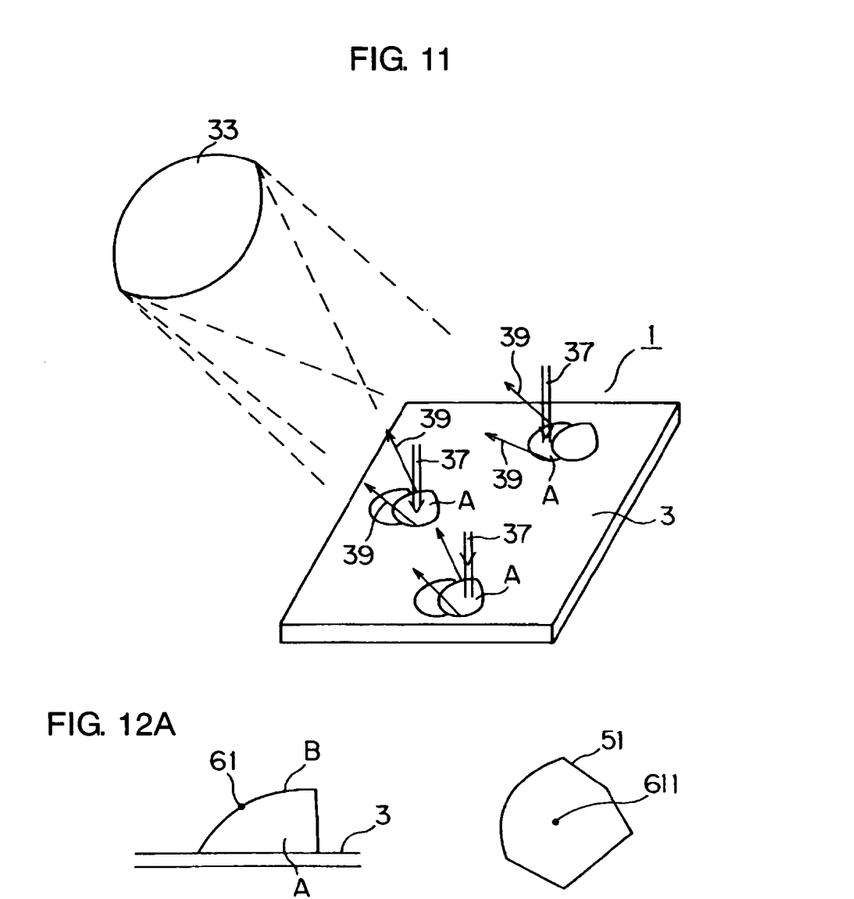
FIG. 11 shows a perspective view of the reflector.

FIG. 11 is a perspective view of a reflector in a fourth embodiment mode of the present invention. The reflection face B of a unit reflecting portion A has a curved shape. An incident light beam 37 incident from the direction perpendicular to the substrate surface 3 is reflected on the unit reflecting portion A. Its emission light beam is diffused, but diffusion reflection light 39 is diffused toward a crossing area 33 (visualizing area) within space. The diffusion reflection lights 39 reflected on all the unit reflecting portions on the reflector cross each other in the crossing area 33 within the space.

Thus, the reflector 1 arranging the unit reflecting portion A therein can converge the diffusion reflection light 39 to the visualizing area. Accordingly, when the reflector 1 is visualized from this converging area, the diffusion reflection lights 39 from all the unit reflecting portions A can be visualized. Namely, utilization efficiency of light can be also raised since the brightness irregularities of the reflection light are small and the diffusion reflection light 39 is further converged to the visualizing area.

As mentioned above, the reflection light of light incident from the perpendicular direction has been considered, but this light also crosses in a predetermined area of the space even when this light is a parallel light beam incident to the reflector at a constant angle.

The crossing area 33 within the space can be formed in an arbitrary shape such as a circular shape, an elliptical shape and others. Further, its face may have a constant inclination within the space with respect to a predetermined plane. Further, it is most preferable that the diffusion reflection lights of all the unit reflecting portions on the reflector cross each other in a predetermined area. However, if the unit reflecting portions are formed so as to cross the diffusion reflection lights from 50% or more of the unit reflecting portions among the plural unit reflecting portions, no human being has an uncomfortable feel with respect to brightness irregularities so that a practical allowance range is attained.

Fifth Embodiment Mode

FIG. 12 is a view for explaining three kinds of preferable reference points.

FIG. 12A shows a case in which a point on the reflection face corresponding to the center point of gravity of a projection face is determined as a reference point. The center point of gravity of the projection face 51 provided by orthogonally projecting the unit reflecting portion A to the substrate surface 3 is set to 611. A point 61 corresponding to the center point 611 of gravity of the projection face is determined on the reflection face B and is set to a reference point.

Figure 12B:
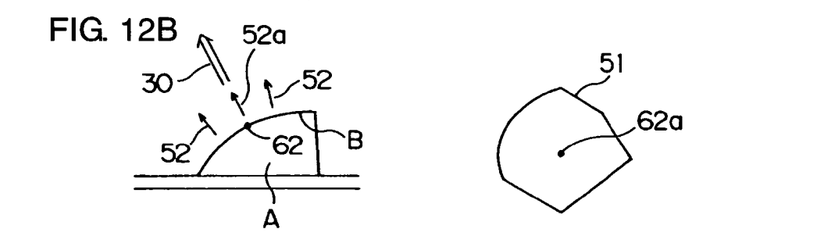
FIG. 12 shows an explanatory view of a reference point.

FIG. 12B shows a case in which a point for giving a normal line vector conformed to an average normal line vector on the reflection face is determined as a reference point. The normal line vector 52 is set at each point on the reflection face B of the unit reflecting portion A, and its average vector 30 is calculated. A point 62 for giving an individual vector 52a conformed to the direction of the average vector 30 on the reflection face B is determined and is set to a reference point. A projection point 62a shows a point on the projection face 51 corresponding to the reference point 62.

Figure 12C:
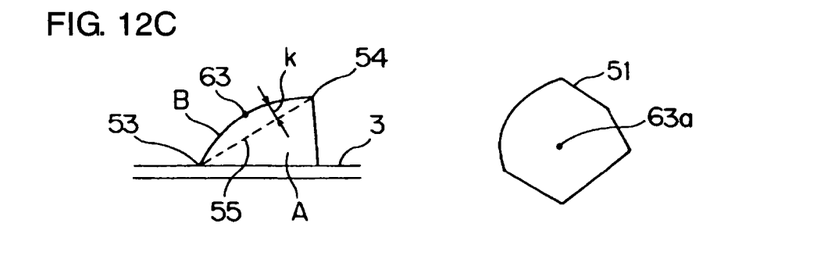

FIG. 12C shows a case in which an inflection point of the curved reflection face is determined as a reference point. In the unit reflecting portion A, a line connecting a minimum point 53 in the distance from the substrate surface 3 and a maximum point 54 in this distance is set to a line segment 55. The distance between the line segment 55 and the reflection face B is set to k, and a point 63 for maximizing the distance k with respect to the reflection face B on the line segment 55 is determined and is set to a reference point. The projection point 63a shows a point on the projection face 51 corresponding to the reference point 63.

The reflection light reflected at the reference point determined as mentioned above is approximately directed to the direction of maximum intensity. Therefore, the reference point can be determined at a point most dominant in the intensity of the reflection light on each reflection face. When the inter-tangential-plane distance (dP) is calculated from the tangential plane abutting on the reflection face at this reference point, and the unit reflecting portion is arranged so as to satisfy 1.5 µm or more in dPmax and/or m in the frequency distribution of the inter-tangential-plane distance (dP), this reflector can greatly reduce the mixture of the interference light.

In the reflector of the present invention explained above, the unit reflecting portion is formed on the surface of the reflector and can set to the reflector of a surface reflection type for reflecting the incident light on the surface of the unit reflecting portion. Further, the substrate can be constructed by transparent glass, transparent resin, semi-transparent resin, etc., and the reflector can be set to the reflector of a rear face reflection type for reflecting the incident light by the unit reflecting portion formed on the rear face of the substrate. Further, the unit reflecting portion may be also formed between the front and rear faces of the substrate.

If at least one substrate among plural substrates for nipping and supporting the liquid crystal layer is particularly constructed by the reflector of the present invention, the number of parts can be reduced and the liquid crystal display device can be made thin.

Ceramic, glass, synthetic resin, etc. can be used as the material of the substrate. These materials may be set to be transparent, semi-transparent and opaque. The substrate may be set to a glass plate forming the electrode of a semiconductor therein, etc. In this case, the upper face of the reflector is normally flattened and processed.

Acrylic, polycarbonate, polyimide resins, etc. are normally used to form the unit reflecting portion. Further, polypropylene, polyurethane, polystyrene, polyimide and polyvinyl chloride can be also used. The reflection face is formed by a thin film of aluminum, silver, etc.

The unit reflecting portion of the present invention may be formed in a convex shape on the substrate and may be also formed in a concave shape. The shape of the base bottom face of the unit reflecting portion can be set to any shape such as a circular shape, a regular polygonal shape, an in equilateral polygonal shape, other polygons, an indefinite shape, etc. The base bottom faces of plural unit reflecting portions formed on one reflector may be formed in the same or similar shape and may be also formed by mixing various shapes.

The unit reflecting portion may be formed by a separate member on the substrate, and may be also directly formed in a film manufactured by resin such as acrylic resin and polycarbonate resin, etc. In the latter case, no substrate is required and the reflector 1 is constructed by the resin layer and the reflection film.

In the manufacture of such a reflector in the present invention, the reflector can be efficiently mass-produced if a stamper having the inversion shape of an irregular shape formed in the reflector is used. Namely, when the reflector is manufactured by using the stamper, the stamper is filled with resin and this resin is hardened and a molded product is then separated from the stamper so that the reflector can be manufactured. Otherwise, the molded product can be manufactured by press working using the stamper. Thus, after the reflector is manufactured, the reflection face constructed by a metallic film is formed on the surface of the molded product.

The stamper can be made by depositing a stamper material such as a metal, resin, etc. in an original stamper having the same shape as plural irregularities formed in a reflection material, and then separating the stamper material from the original stamper and transferring the shape of the original stamper.

Such a reflector in the present invention can be also manufactured by using a so-called gray mask. In this method, a resin layer is coated with a photoresist, and the photoresist is exposed and developed by using a photomask having areas of different transmittances in accordance with places, the so-called gray mask. When dry etching such as reactive ion etching, etc. is next performed, the surface shape of the above resist pattern is reflected on the surface of the resin layer and the shape of the reflector is formed. Thereafter, the reflection face is formed as a film as mentioned above.

Figure 13:
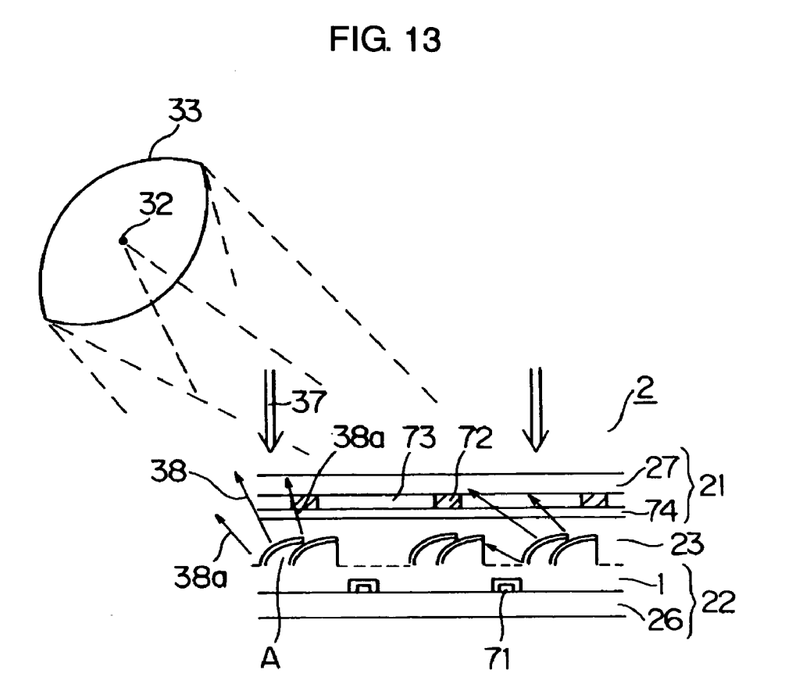
FIG. 13 shows an explanatory view of the liquid crystal display device.

FIG. 13 is an explanatory view showing the structure of the liquid crystal display device 2 having such a reflector in the present invention. A thin film transistor (TFT) 71 is formed on the surface of a substrate 26 manufactured by glass, and a reflector 1 is formed on this thin film transistor 71. The reflector 1 is constructed by coating the surface of the glass substrate 26 with a resin layer and forming a unit reflecting portion A on the surface of the resin layer. The glass substrate 26 and the reflector 1 are integrally made.

An upper side substrate 21 has a black matrix 72, a color filter 73 and a transparent electrode (ITO) 74 on the rear face of a glass plate 27, and further has an unillustrated polarizing plate. A liquid crystal layer 23 is nipped between a transparent electrode 74 and the reflector 1.

An incident light beam 37 incident from the surface of the liquid crystal display device 2 is diffused and reflected on a unit reflecting portion A. Maximum intensity directions 38 of the reflection lights of all the unit reflecting portions A cross each other in a predetermined position 32 in space. Further, emission lights 38a diffused and reflected on all the unit reflecting portions A cross each other in a crossing area 33 in space.

Such a liquid crystal display device in the present invention may have an auxiliary light source except for external light, and may be also set to have no auxiliary light source. The auxiliary light source may be attached to the front face side of the liquid crystal display device and may be also attached to the rear face side. When the auxiliary light source is attached to the rear face side of the liquid crystal display device, one portion of the reflector is set to be able to transmit light and the reflector in the present invention is arranged in the remaining portions.

The display device using the reflector in the present invention is not limited to the liquid crystal display device, and also includes a display plate, an advertisement plate, etc. in which the reflector is arranged on the rear face of a translucent synthetic resin plate.

Figure 14:
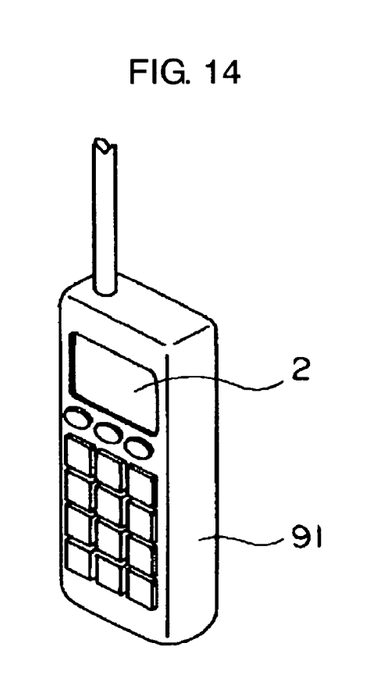
FIG. 14 shows a perspective view showing the external appearance of a wireless information transmitter.

FIG. 14 is a perspective view showing the external appearance of a wireless information transmitter 91 such as a portable telephone, a weak electric power wireless device, etc. using the liquid crystal display device 2 assembling the reflector of the present invention thereinto as a display.

Figure 15:
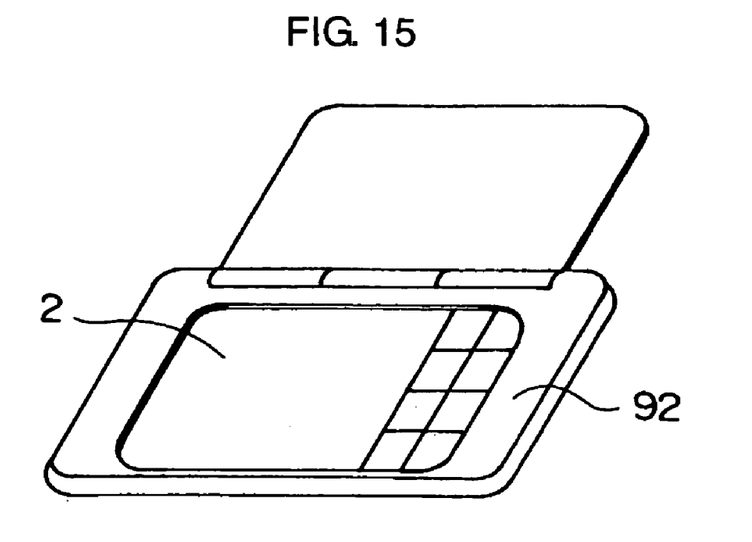
FIG. 15 shows a perspective view showing the external appearance of a portable information terminal.

FIG. 15 is a perspective view showing the external appearance of a portable information terminal 92 such as an electronic note, a portable computer, etc. using the liquid crystal display device 2 assembling the reflector of the present invention thereinto as a display.

This embodiment mode can be applied to other electronic apparatuses such as a portable television set, etc. in addition to the above wireless information transmitter and portable information terminal.

The following description shows the measuring results of existence of coloring of a rainbow shape generated in the reflector when the distance dP between tangential planes is changed.

EXPERIMENTAL EXAMPLE 1

Figure 16:
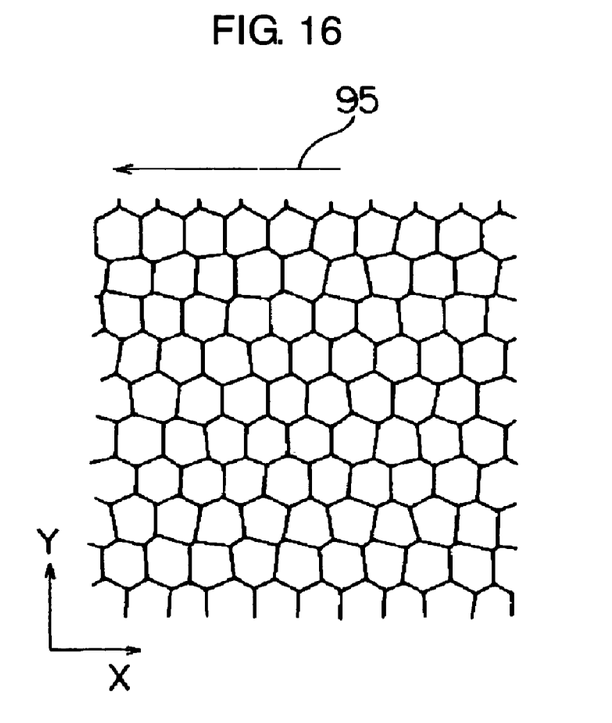
FIG. 16 shows a top view showing one portion of the reflection face of the reflector.

FIG. 16 shows a top view of the reflector used in this experiment. An arrow line 95 within this FIG. 16 shows a line segment in which an average vector of the reflection face of the unit reflecting portion is calculated and a vector obtained by averaging the average vectors of all the unit reflecting portions is further orthogonally projected onto the substrate surface as a predetermined plane. The arrow direction of the arrow line 95 is a main direction to which emission light is directed.

Values relating to the size, shape, arrangement, etc. of the unit reflecting portion are provided as follows.

Top view of reflector: FIG. 16

Average value (DP) of dP: variable from 0 to 2.5

Average distance between center points of gravity of projection faces: 20 μm

Average height of unit reflecting portion: 1.5 μm to 6.5 μm

Dispersion value of distance between center points of gravity: 0.15

Dispersion value of height of unit reflecting portion: 0.15

Here, the distance between the center points of gravity of the projection faces is the length of a line segment connecting a first center point of gravity of the projection face to a predetermined plane of the unit reflecting portion, and a second center point of gravity of the projection face to a predetermined plane of a unit reflecting portion adjacent to the above unit reflecting portion. Further, the height of the unit reflecting portion is a maximum perpendicular distance from the base bottom plane (an average plane of the base bottom face of the unit reflecting portion) of the reflection face.

In six kinds of reflectors, the inter-tangential-plane distance dP is changed by changing the crossing angle α of the individual unit reflecting portion, and its average value is changed. The existence of coloring due to the reflection light of this reflector itself was measured under the sunlight at a fine weather time. Table 1 shows the measured results.

TABLE 1

| DP (μm) | Existence of coloring |
|---------|----------------------|
| 0 | existence |
| 0.5 | existence |
| 1 | existence |
| 1.5 | nonexistence |
| 2 | nonexistence |
| 2.5 | nonexistence |

A reflector having 1.5 μm or more in DP and no coloring was obtained.

Further, the same reflector was used in the reflector of the liquid crystal display device, and the existence of coloring was measured under the sunlight at the fine weather time. Thus, similar to the experimental results of only the reflector, the liquid crystal display device having 1.5 μm or more in DP and no coloring was obtained.

EXPERIMENTAL EXAMPLE 2

The effects of the present invention were confirmed by changing dP in another method.

Figure 17:
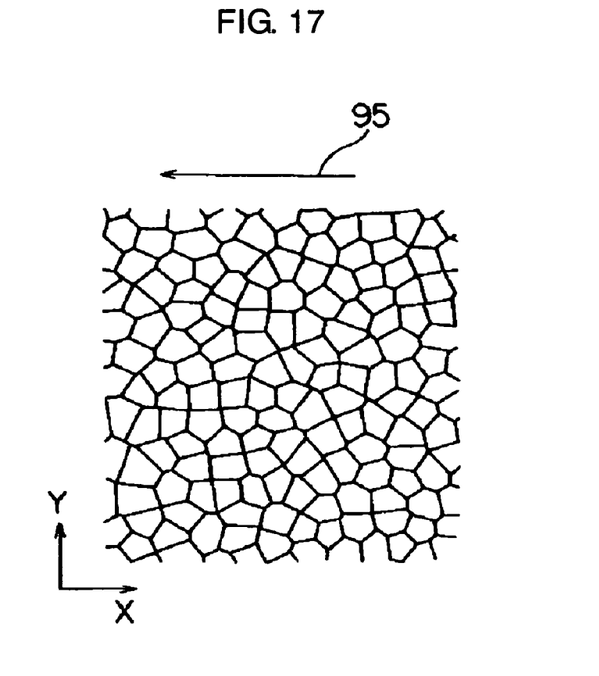
FIG. 17 shows a top view showing one portion of the reflection face of the reflector.

FIG. 17 shows a top view of the reflector used in this experiment. An arrow line 95 in FIG. 17 is a projection line of an average vector similar to that in FIG. 16. This experiment is an example in which the arrangement of irregularities adjacent in the Y-axis direction is shifted in the X-axis direction and the arrangement of irregularities adjacent in the X-axis direction is also shifted in the Y-axis direction.

Values relating to the size, shape, arrangement, etc. of the unit reflecting portion are provided as follows.

Top view of reflector: FIG. 17
Average value (DP) of dP: 1.5 μm
Average distance between center points of gravity of projection faces: 20 μm
Average height of unit reflecting portion: 4 μm
Dispersion value of distance between center points of gravity: 0.25
Dispersion value of height of unit reflecting portion: 0.15

When the existence of coloring due to the reflection light of this reflector itself was measured under the sunlight at the fine weather time, the reflector having no coloring was obtained.

EXPERIMENTAL EXAMPLE 3

The brightness of the reflection light was measured by changing the dispersion value of the distance between the center points of gravity of the projection faces and the dispersion value of the height of the unit reflecting portion. Values relating to the size, shape, arrangement, etc. of the unit reflecting portion are provided as follows.

EXPERIMENT EXAMPLE-3.1

Figure 18:
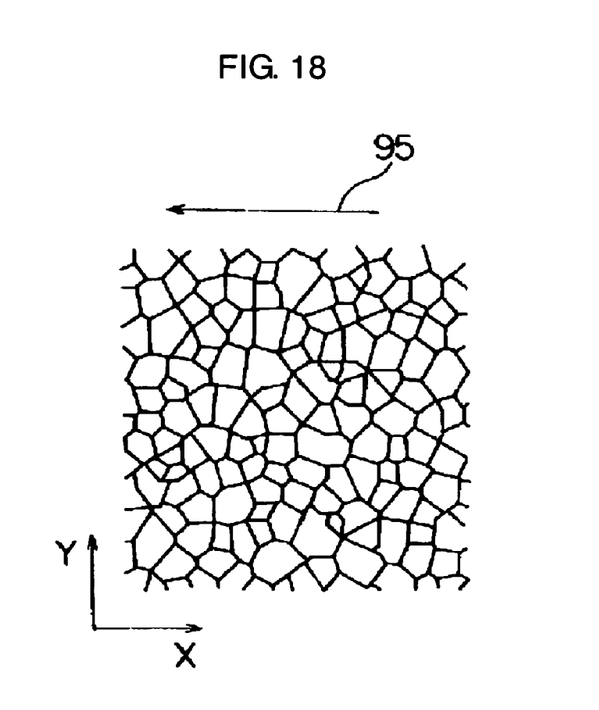
FIG. 18 shows a top view showing one portion of the reflection face of the reflector.

Top view of reflector: FIG. 18
Average value (DP) of dP: 1.5 μm
Average distance between center points of gravity of projection faces: 10 μm
Maximum height of unit reflecting portion: 2.5 μm
Dispersion value of distance between center points of gravity: 0.15
Dispersion value of height of unit reflecting portion: 0.15
Crossing angle α: 10 degrees

EXPERIMENT EXAMPLE-3.2

Top view of reflector: FIG. 16
Average value (DP) of dP: 1.5 μm
Average distance between center points of gravity of projection faces: 10 μm
Maximum height of unit reflecting portion: 2.5 μm
Dispersion value of distance between center points of gravity: 0.6
Dispersion value of height of unit reflecting portion: 0.6
Crossing angle α: 10 degrees When the existence of coloring due to the reflection light in only the reflector of each of the experimental example-3.1 and the experimental example-3.2 was measured under the sunlight at the fine weather time, no coloring was observed in each example.

In contrast to this, when light was incident from just above the reflector and brightness was measured in the direction of 20 degrees from the reflector, brightness in the experimental example-3.1 was 1.2 times in comparison with the experimental example-3.2.

EXPERIMENTAL EXAMPLE 4

Roughness of light on the reflector was simulated and tested by changing the dispersion value of the distance between the center points of gravity of the projection faces. Values relating to the size, shape, arrangement, etc. of the unit reflecting portion are provided as follows.

Surface view of reflector: FIG. 10
Average value (DP) of dP: 1.5 μm
Average distance between center points of gravity of projection faces: 10 m
Maximum height of unit reflecting portion: 2.5 μm
Dispersion value of distance between center points of gravity: variable from 0.1 to 0.6
Dispersion value of height of unit reflecting portion: 0.15

TABLE 2

| Dispersion value of distance | Rough feel |
|------------------------------|------------|
| 0.1 | ○ |
| 0.2 | ○ |
| 0.3 | ○ |
| 0.4 | Δ |
| 0.5 | X |
| 0.6 | X |

○ shows the nonexistence of a rough feel and
Δ shows a slight rough feel and
X shows the existence of the rough feel.

When the dispersion value of the distance was set to 0.3 or less, no rough feel appeared.

EXPERIMENTAL EXAMPLE 5

Roughness of light on the reflector was simulated and tested by changing the dispersion value of the height of the unit reflecting portion. Values relating to the size, shape, arrangement, etc. of the unit reflecting portion are provided as follows.

Surface view of reflector: FIG. 8
Average value (DP) of dP: 1.5 μm to 2 μm
Average distance between center points of gravity of projection faces: 10 μm Maximum height of unit reflecting portion: 2.5 µm to 3 µm Dispersion value of distance between center points of gravity: 0.15

Dispersion value of height of unit reflecting portion: variable from 0.1 to 1.6

TABLE 3

| Dispersion value of height | Rough feel |
|---|---|
| 0.1 | ○ |
| 0.2 | ○ |
| 0.3 | Δ |
| 0.4 | X |
| 0.5 | X |
| 0.6 | X |

○ shows the nonexistence of a rough feel and
Δ shows a slight rough feel and
X shows the existence of the rough feel.

When the dispersion value of the height was set to 0.2 or less, no rough feel appeared.

The following contents can be said from the results of these experimental examples.

With respect to all the above plural unit reflecting portions, the length of a line segment connecting a first center point of gravity of the projection face to a predetermined plane of the unit reflecting portion, and a second center point of gravity of the projection face to a predetermined plane of a unit reflecting portion adjacent to the above unit reflecting portion is calculated. A half value width of a distribution graph of the above length and an average value of the above length are calculated, and it is preferable if a value (dispersion value of the distance) provided by dividing this half value width by the above average value is 0.3 or less.

When the distribution of the distance of the center point of gravity of the projection face lies in the above range, it is easy to approximately constantly set the angle of an inclination face of the unit reflecting portion. Accordingly, since uniform light approximately reaches an observation point from all irregularities, no rough feel of the screen is generated even when interference is removed. Further, since a large part of the incident light beam can be emitted to a constant area at the observation point, no utilization efficiency of light is reduced even when the interference is removed.

With respect to all the plural unit reflecting portions, the maximum perpendicular distance (hereinafter called a unit reflecting portion height) from the above base bottom plane of the reflection face is calculated, and a half value width of a distribution graph of the unit reflecting portion height and an average value of the irregular height are calculated, and it is preferable if a value (dispersion value of the height) provided by dividing this half value width by the above average value is 0.2 or less.

Here, the base bottom plane is an average plane of the base bottom face of the unit reflecting portion. The unit reflecting portion height is the length of a perpendicular line drawn to the base bottom plane from an irregular vertex, a ridgeline, etc. In the case of a convex shape, the perpendicular line is drawn toward the bottom face from the vertex, etc. In the case of a concave shape, the perpendicular line is drawn toward an opening face from the vertex, etc.

When the distribution of the unit reflecting portion height lies in the above range, it is easy to approximately constantly set the angle of the inclination face of the reflection face. Accordingly, since uniform light approximately reaches the observation point from all the irregularities, no rough feel of the screen is generated even when interference is removed. Further, since a large part of the incident light beam can be emitted to a constant area at the observation point, no utilization efficiency of light is reduced even when the interference is removed.

The distance between center points of gravity of the projection faces to a predetermined plane of the unit reflecting portion is preferably set to range from 5 to 50 µm. The average of the distances between the center points of gravity of the projection faces to the predetermined plane of the unit reflecting portion is preferably set to range from 8 to 40 µm. The height of the unit reflecting portion is preferably set to range from 1 to 15 µm. The average of the height of the unit reflecting portion is preferably set to range from 1.5 to 15 µm.

The embodiment modes of the present invention can be combined as much as possible.

What is claimed is:

1. A reflector comprising:
   a predetermined plane;
   a plurality of unit reflecting portions disposed parallel to said predetermined plane, wherein at least one of said plurality of unit reflecting portions has a reflection face configured to reflect incident light in a different direction from regular reflection light of said predetermined plane;
   a first reflection face arranged in a first unit reflecting portion comprising a first tangential plane tangent to the first reflection face at a reference point on the first reflection face; and
   a second reflection face arranged in a second unit reflecting portion adjacent to said first unit reflecting portion comprising a second tangential plane parallel to said first tangential plane and tangent to the second reflection face,
   wherein the reference point is selected from a portion of the first reflection face that dominates a light intensity from the first reflection face, and
   wherein a shortest distance between the reference point and the second tangential plane is between half of a coherent length of the incident light and 20 µm.

2. A reflector comprising:
   a predetermined plane;
   a plurality of unit reflecting portions disposed parallel to said predetermined plane, wherein at least one of said plurality of unit reflecting portions has a reflection face configured to reflect incident light in a different direction from regular reflection light of said predetermined plane;
   a first reflection face arranged in a first unit reflecting portion comprising a first tangential plane tangent to the first reflection face at a reference point on the first reflection face; and
   a plurality of second reflection faces arranged in second unit reflecting portions adjacent to said first unit reflecting portion, each of the plurality of second reflection faces comprising a second tangential plane parallel to said first tangential plane and tangent to the second reflection face, wherein an average of a plurality of shortest distances between the reference point and each of the second tangential planes is between half of a coherent length of the incident light and 20 µm.

3. A reflector comprising:
   a predetermined plane,
   a plurality of unit reflecting portions disposed parallel to said predetermined plane, wherein at least one of said plurality of unit reflecting portions has a reflection face configured to reflect incident light in a different direction from regular reflection light of said predetermined plane;

a first reflection face arranged in a first unit reflecting portion comprising a first tangential plane tangent to the first reflection face at a reference point on the first reflection face; and a second reflection face arranged in a second unit reflecting portion adjacent to said first unit reflecting portion comprising a second tangential plane parallel to said first tangential plane and tangent to the second reflection face, wherein a distance between the first tangential plane and the second tangential plane is defined as a shortest distance between the first tangential plane and the second tangential plane, and a plurality of distances is similarly defined for the plurality of unit reflecting portions, and wherein when a frequency distribution is calculated for a number of unit reflecting portions as a function of the plurality of distances, the distance at a maximum frequency is between half of a coherent length of the incident light and 20 µm.

4. The reflector according to claim 3, wherein the distance between said first tangential plane and said second tangential plane is set to be 80 µm or less.

5. The reflector according to claim 3, wherein each of said reflection faces has a curved shape, and the average value of an angle formed by said predetermined plane and a plane perpendicular to an average vector of a normal line vector calculated at each point on said curved face ranges between 5 degrees and 15 degrees.

6. The reflector according to claim 5, wherein said plural of unit reflecting portions are arranged such that directions for maximizing the intensity of the reflection light reflected by said reflection face cross each other in a predetermined position.

7. The reflector according to claim 5, wherein said plural of unit reflecting portions are arranged such that diffusion reflection lights reflected by said reflection face cross each other in a predetermined area.

8. The reflector according to claim 3, wherein each of said reflection faces has a curved shape, and said reference point is one at which a point orthogonally projected onto said predetermined plane is conformed to the center point of gravity of a projection figure caused when said unit reflection portion is orthogonally projected onto said predetermined plane, a point at which a normal line vector calculated at one point on said reflection face is similarly conformed to an average vector of the normal line vector calculated at each point, and a point for maximizing the distance from a line segment connecting minimum and maximum points in the distance with respect to said predetermined plane on said reflection face to said reflection face.

9. A display device having a reflection member for performing display by reflecting light incident from an exterior of the reflection member, wherein the reflection member is constructed by the reflector according to claim 3.

10. An electronic apparatus characterized by that the display device of claim 9 is used as a display.

11. A light reflecting method, comprising:
projecting incident light from a direction of regular reflection of a predetermined plane; and
reflecting the incident light in a direction different from the direction of regular reflection of the predetermined plane using a reflector;
the reflector comprising:
a predetermined plane;
a plurality of unit reflecting portions disposed in parallel to said predetermined plane, wherein at least one of said plurality of unit reflecting portions has a reflection face configured to reflect incident light in a different direction from regular reflection light of said predetermined plane;
a first reflection face arranged in a first unit reflecting portion comprising a first tangential plane tangent to the first reflection face; and
a second reflection face arranged in a second unit reflecting portion adjacent to said first unit reflecting portion comprising a second tangential plane parallel to said first tangential plane and tangent to the second reflection face,
wherein when a frequency distribution is calculated for a number of unit reflection portions as a function of a shortest distance between the first tangential plane and the second tangential plane, the shortest distance corresponding to a maximum frequency is between half of a coherent length of the incident light and 20 µm.

12. The reflector of claim 1, wherein the portion of the first reflection face that dominates a light intensity from the first reflection face includes a center point of gravity of a projection face.

* * * * *